(12) United States Patent
Wagner et al.

(10) Patent No.: US 11,718,479 B2
(45) Date of Patent: *Aug. 8, 2023

(54) SYSTEMS AND METHODS FOR PROCESSING OBJECTS, INCLUDING AUTOMATED RADIAL PROCESSING STATIONS

(71) Applicant: Berkshire Grey Operating Company, Inc., Bedford, MA (US)

(72) Inventors: Thomas Wagner, Concord, MA (US); Kevin Ahearn, Nebo, NC (US); John Richard Amend, Jr., Belmont, MA (US); Benjamin Cohen, Somerville, MA (US); Michael Dawson-Haggerty, Pittsburgh, PA (US); William Hartman Fort, Stratham, NH (US); Christopher Geyer, Arlington, MA (US); Jennifer Eileen King, Oakmont, PA (US); Thomas Koletschka, Cambridge, MA (US); Michael Cap Koval, Mountain View, CA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 203 days.

This patent is subject to a terminal disclaimer.

(21) Appl. No.: 17/124,925

(22) Filed: Dec. 17, 2020

(65) Prior Publication Data
US 2021/0101749 A1    Apr. 8, 2021

Related U.S. Application Data

(63) Continuation of application No. 15/928,556, filed on Mar. 22, 2018, now Pat. No. 10,906,740.
(Continued)

(51) Int. Cl.
*B65G 1/137* (2006.01)
*B07C 3/00* (2006.01)
(Continued)

(52) U.S. Cl.
CPC ............ *B65G 1/1376* (2013.01); *B07C 3/008* (2013.01); *B07C 5/3412* (2013.01); *B25J 9/0093* (2013.01);
(Continued)

(58) Field of Classification Search
CPC .. B65G 1/1376; B65G 1/1371; B65G 1/1373; B07C 3/008; B07C 5/3412; B25J 9/0093; G06K 7/10861; G06Q 10/087
See application file for complete search history.

(56) References Cited

U.S. PATENT DOCUMENTS

| 3,592,326 A | 7/1971 | Zimmerle et al. |
| 4,722,653 A | 2/1988 | Williams et al. |

(Continued)

FOREIGN PATENT DOCUMENTS

| CN | 102625901 A | 8/2012 |
| CN | 102884539 A | 1/2013 |

(Continued)

OTHER PUBLICATIONS

International Preliminary Report on Patentability issued by the International Bureau of WIPO in related International Application No. PCT/US2018/023755 dated Sep. 24, 2019, 7 pages.
(Continued)

*Primary Examiner* — Thomas Randazzo
(74) *Attorney, Agent, or Firm* — Gesmer Updegrove LLP

(57) ABSTRACT

A method of processing objects using a programmable motion device is disclosed. The method includes the steps of perceiving identifying indicia representative of an identity of a plurality of objects and directing the plurality of objects
(Continued)

toward an input area from at least one input conveyance system, acquiring an object from the plurality of objects at the input area using an end effector of the programmable motion device, and moving the acquired object toward an identified processing location using the programmable motion device, said identified processing location being associated with the identifying indicia and said identified processing location being provided as one of a plurality of processing locations that are radially spaced from the programmable motion device.

33 Claims, 11 Drawing Sheets

Related U.S. Application Data

(60) Provisional application No. 62/474,797, filed on Mar. 22, 2017.

(51) Int. Cl.
  *B07C 5/34* (2006.01)
  *G06K 7/10* (2006.01)
  *G06Q 10/08* (2023.01)
  *G06Q 10/087* (2023.01)
  *B25J 9/00* (2006.01)

(52) U.S. Cl.
  CPC ....... *B65G 1/1371* (2013.01); *G06K 7/10861* (2013.01); *G06Q 10/087* (2013.01); *B65G 1/1373* (2013.01)

(56) References Cited

U.S. PATENT DOCUMENTS

| | | | |
|---|---|---|---|
| 4,846,619 A * | 7/1989 | Crabtree | B65G 1/045 |
| | | | 901/17 |
| 5,281,081 A * | 1/1994 | Kato | B65G 1/1378 |
| | | | 414/789.6 |
| 5,595,263 A | 1/1997 | Pignataro | |
| 5,860,900 A | 1/1999 | Dunning et al. | |
| 6,011,998 A | 1/2000 | Lichti et al. | |
| 6,036,812 A * | 3/2000 | Williams | G07F 11/62 |
| | | | 414/226.02 |
| 6,059,092 A | 5/2000 | Jerue et al. | |
| 6,505,093 B1 | 1/2003 | Thatcher et al. | |
| 9,020,632 B2 * | 4/2015 | Naylor | B65G 1/0492 |
| | | | 414/277 |
| 9,120,622 B1 | 9/2015 | Elazary et al. | |
| 9,481,518 B2 | 11/2016 | Neiser | |
| 9,694,977 B2 | 7/2017 | Aprea et al. | |
| 9,751,693 B1 * | 9/2017 | Battles | B25J 9/0084 |
| 9,999,977 B2 | 6/2018 | Wagner et al. | |
| 10,007,827 B2 | 6/2018 | Wagner et al. | |
| 10,029,865 B1 * | 7/2018 | McCalib, Jr. | B65G 1/06 |
| 10,118,300 B2 | 11/2018 | Wagner et al. | |
| 10,315,315 B2 | 6/2019 | Wagner et al. | |
| 10,335,956 B2 | 7/2019 | Wagner et al. | |
| 10,906,740 B2 * | 2/2021 | Wagner | B65G 1/1376 |
| 2003/0034281 A1 | 2/2003 | Kumar | |
| 2003/0075051 A1 * | 4/2003 | Watanabe | B65B 5/105 |
| | | | 99/468 |
| 2005/0220600 A1 | 10/2005 | Baker et al. | |
| 2007/0005179 A1 * | 1/2007 | Mccrackin | B25J 9/163 |
| | | | 700/213 |
| 2008/0181753 A1 * | 7/2008 | Bastian | B65G 1/1376 |
| | | | 414/277 |
| 2011/0144798 A1 | 6/2011 | Freudelsperger | |
| 2011/0238207 A1 * | 9/2011 | Bastian, II | B65G 61/00 |
| | | | 700/217 |
| 2011/0243707 A1 * | 10/2011 | Dumas | B65B 5/105 |
| | | | 700/259 |
| 2013/0110280 A1 | 5/2013 | Folk | |
| 2013/0334158 A1 * | 12/2013 | Koch | B66C 23/82 |
| | | | 212/255 |
| 2014/0086714 A1 | 3/2014 | Malik | |
| 2014/0244026 A1 * | 8/2014 | Neiser | B65G 1/1378 |
| | | | 700/216 |
| 2014/0277693 A1 | 9/2014 | Naylor | |
| 2015/0057793 A1 | 2/2015 | Kawano | |
| 2015/0073589 A1 | 3/2015 | Khodl et al. | |
| 2015/0081090 A1 * | 3/2015 | Dong | B25J 13/08 |
| | | | 700/230 |
| 2015/0098775 A1 | 4/2015 | Razumov | |
| 2015/0114799 A1 * | 4/2015 | Hansl | B65G 1/1378 |
| | | | 198/601 |
| 2015/0203297 A1 * | 7/2015 | Manning | G07F 11/54 |
| | | | 700/218 |
| 2016/0221187 A1 | 8/2016 | Bradski et al. | |
| 2016/0325934 A1 * | 11/2016 | Stiernagle | G07F 11/165 |
| 2017/0021499 A1 | 1/2017 | Wellman et al. | |
| 2017/0057091 A1 | 3/2017 | Wagner et al. | |
| 2017/0080571 A1 | 3/2017 | Wagner et al. | |
| 2017/0080579 A1 | 3/2017 | Wagner et al. | |
| 2017/0087718 A1 | 3/2017 | Wagner et al. | |
| 2017/0087731 A1 | 3/2017 | Wagner et al. | |
| 2017/0120455 A1 | 5/2017 | Wagner et al. | |
| 2017/0121113 A1 | 5/2017 | Wagner et al. | |
| 2017/0121114 A1 * | 5/2017 | Einav | B65D 21/0209 |
| 2017/0136632 A1 | 5/2017 | Wagner et al. | |
| 2017/0157648 A1 | 6/2017 | Wagner et al. | |
| 2017/0197316 A1 | 7/2017 | Wagner et al. | |
| 2017/0225330 A1 | 8/2017 | Wagner et al. | |
| 2017/0322561 A1 * | 11/2017 | Stiernagle | G07F 11/62 |
| 2017/0349385 A1 | 12/2017 | Moroni et al. | |
| 2018/0127219 A1 | 5/2018 | Wagner et al. | |
| 2018/0148272 A1 | 5/2018 | Wagner et al. | |
| 2018/0244473 A1 * | 8/2018 | Mathi | B65G 47/905 |
| 2018/0265291 A1 | 9/2018 | Wagner et al. | |
| 2018/0265298 A1 | 9/2018 | Wagner et al. | |
| 2018/0265311 A1 | 9/2018 | Wagner et al. | |
| 2018/0273295 A1 | 9/2018 | Wagner et al. | |
| 2018/0273297 A1 | 9/2018 | Wagner et al. | |
| 2018/0273298 A1 | 9/2018 | Wagner et al. | |
| 2018/0282066 A1 | 10/2018 | Wagner et al. | |
| 2018/0312336 A1 | 11/2018 | Wagner et al. | |
| 2018/0327198 A1 | 11/2018 | Wagner et al. | |
| 2018/0330134 A1 | 11/2018 | Wagner et al. | |
| 2018/0333749 A1 | 11/2018 | Wagner et al. | |
| 2019/0001505 A1 | 1/2019 | Wagner et al. | |

FOREIGN PATENT DOCUMENTS

| | | |
|---|---|---|
| CN | 106395225 A | 2/2017 |
| DE | 20011842 A1 | 7/1971 |
| DE | 19857282 A1 | 6/2000 |
| DE | 102010002317 A1 | 8/2011 |
| DE | 102012102333 A1 | 9/2013 |
| JP | S54131278 A | 10/1979 |
| JP | 2010201536 A | 9/2010 |
| JP | 2007182286 A | 7/2019 |
| WO | 2006065147 A1 | 6/2006 |
| WO | 2008059457 A1 | 5/2008 |
| WO | 2012024714 A2 | 3/2012 |
| WO | 2015118171 A1 | 8/2015 |
| WO | 2017010928 A1 | 1/2017 |
| WO | 2017044747 A1 | 3/2017 |

OTHER PUBLICATIONS

International Search Report and Written Opinion issued by the International Searching Authority in related International Application No. PCT/US2018/023755 dated May 29, 2018, 10 pages.

Wikipedia: Machine Vision, Internet Article, Mar. 1, 2017, XP055476478, retrieved from the internet: URL:https://en.wikipedia.org/w/index.php?title=Machine_vision&oldid=768036938, retrieved on May 17, 2018, 4 pages.

Wikipedia: Automatic identification and data capture, Internet Article, Mar. 10, 2017, XP055476501, retrieved from the internet: URL:https://

(56) References Cited

OTHER PUBLICATIONS en.wikipedia.org/w/index.php?title=Automatic_identification_and_data_capture&oldid=7695.
Non-Final Office Action issued by the U.S. Patent and Trademark Office in related U.S. Appl. No. 15/928,556 dated Mar. 1, 2019, 25 pages.
Final Office Action issued by the U.S. Patent and Trademark Office in related U.S. Appl. No. 15/928,556 dated Oct. 24, 2019, 23 pages.
Non-Final Office Action issued by the U.S. Patent and Trademark Office in related U.S. Appl. No. 15/928,556 dated Apr. 6, 2020, 26 pages.
Communication pursuant to Rules 161(1) and 162 EPC issued by the European Patent Office in related European Patent Application No. 18719703.3 dated Oct. 29, 2019, 3 pages.
Communication pursuant to Article 94(3) EPC issued by the European Patent Office in related European Patent Application No. 18719703.3 dated Apr. 29, 2021, 7 pages.
Examiner's Report issued by the Innovation, Science and Economic Development Canada in related Canadian Patent Application No. 3,056,922 dated Dec. 30, 2020, 5 pages.
Notice on the First Office Action, along with its English translation, issued in related Chinese Patent Application No. 201880020412.8 issued by the China National Intellectual Property Administration dated Nov. 21, 2022, 20 pages.

\* cited by examiner

SYSTEMS AND METHODS FOR PROCESSING OBJECTS, INCLUDING AUTOMATED RADIAL PROCESSING STATIONS

PRIORITY

The present application is a continuation of U.S. patent application Ser. No. 15/928,556, filed Mar. 22, 2018, now U.S. Pat. No. 10,906,740, issued Feb. 2, 2021, which claims priority to U.S. Provisional Patent Application Ser. No. 62/474,797 filed Mar. 22, 2017, the disclosures of which are hereby incorporated by reference in their entireties.

BACKGROUND

The invention generally relates to automated programmable motion control systems, e.g., robotic, sortation and other processing systems, and relates in particular to programmable motion control systems intended for use in environments requiring that a variety of objects (e.g., articles, packages, consumer products etc.) be processed and moved to a number of processing destinations.

Many object distribution systems, for example, receive objects in a disorganized stream or bulk transfer that may be provided as individual objects or objects aggregated in groups such as in bags, arriving on any of several different conveyances, commonly a conveyor, a truck, a pallet a Gaylord, or a bin etc. Each object must then be distributed to the correct destination location (e.g., a container) as determined by identification information associated with the object, which is commonly determined by a label printed on the object. The destination location may take many forms, such as a bag, a shelf, a container, or a bin.

The processing (e.g., sortation or distribution) of such objects has traditionally been done, at least in part, by human workers that scan the objects, for example with a hand-held barcode scanner, and then place the objects at assigned locations. Many order fulfillment operations, for example, achieve high efficiency by employing a process called wave picking. In wave picking, orders are picked from warehouse shelves and placed at locations (e.g., into bins) containing multiple orders that are sorted downstream. At the sorting stage, individual objects are identified, and multi-object orders are consolidated, for example, into a single bin or shelf location, so that they may be packed and then shipped to customers. The process of sorting these objects has traditionally been done by hand. A human sorter picks an object, and then places the object in the so-determined bin or shelf location where all objects for that order or manifest have been defined to belong. Automated systems for order fulfillment have also been proposed. See, for example, U.S. Patent Application Publication No. 2014/0244026, which discloses the use of a robotic arm together with an arcuate structure that is movable to within reach of the robotic arm.

The identification of objects by code scanning generally either require manual processing, or require that the code location be controlled or constrained so that a fixed or robot-held code scanner (e.g., a barcode scanner) can reliably detect the code. Manually operated barcode scanners are therefore generally either fixed or handheld systems. With fixed systems, such as those at point-of-sale systems, the operator holds the article and places it in front of the scanner, which scans continuously, and decodes any barcodes that it can detect. If the article's code is not immediately detected, the person holding the article typically needs to vary the position or orientation of the article with respect to the fixed scanner, so as to render the barcode more visible to the scanner. For handheld systems, the person operating the scanner may look at the barcode on the article, and then hold the article such that the barcode is within the viewing range of the scanner, and then press a button on the handheld scanner to initiate a scan of the barcode.

Further, many distribution center sorting systems generally assume an inflexible sequence of operation whereby a disorganized stream of input objects is provided (by a human) as a singulated stream of objects that are oriented with respect to a scanner that identifies the objects. An induction element or elements (e.g., a conveyor, a tilt tray, or manually movable bins) transport the objects to desired destination locations or further processing stations, which may be a bin, a chute, a bag or a conveyor etc.

In conventional object sortation or distribution systems, human workers or automated systems typically retrieve objects in an arrival order, and sort each object into a collection bin based on a set of given heuristics. For example, all objects of a like type might be directed to a particular collection bin, or all objects in a single customer order, or all objects destined for the same shipping destination, etc. may be directed to a common destination location. Generally, the human workers, with the possible limited assistance of automated systems, are required to receive objects and to move each to their assigned collection bin. If the number of different types of input (received) objects is large, then a large number of collection bins is required.

FIG. 1 for example, shows an object distribution system 10 in which objects arrive, e.g., in trucks, as shown at 12, are separated and stored in packages that each include a specific combination of objects as shown at 14, and the packages are then shipped as shown at 16 to different retail stores, providing that each retail store receives a specific combination of objects in each package. Each package received at a retail store from transport 16, is broken apart at the store and such packages are generally referred to as break-packs. In particular, incoming trucks 12 contain vendor cases 18 of homogenous sets of objects. Each vendor case, for example, may be provided by a manufacturer of each of the objects. The objects from the vendor cases 18 are moved into decanted bins 20, and are then brought to a processing area 14 that includes break-pack store packages 22. At the processing area 14, the break-pack store packages 22 are filled by human workers that select items from the decanted vendor bins to fill the break-pack store packages according to a manifest. For example, a first set of the break-pack store packages may go to a first store (as shown at 24), and a second set of break-pack store packages may go to a second store (as shown at 26). In this way, the system may accept large volumes of product from a manufacturer, and then re-package the objects into break-packs to be provided to retail stores at which a wide variety of objects are to be provided in a specific controlled distribution fashion.

Such a system however, has inherent inefficiencies as well as inflexibilities since the desired goal is to match incoming objects to assigned collection bins. Such systems may require a large number of collection bins (and therefore a large amount of physical space, large investment costs, and large operating costs), in part, because sorting all objects to all destinations at once is not always most efficient. Additionally, such break-pack systems must also monitor the volume of each like object in a bin, requiring that a human worker continuously count the items in a bin.

Further, current state-of-the-art sortation systems also rely on human labor to some extent. Most solutions rely on a worker that is performing sortation, by scanning each object from an induction area (e.g., vendor tote, vendor bin, chute, table, etc.) and placing each object at a staging location, conveyor, or collection bin. When a bin is full, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Unfortunately, these systems do not address the limitations of the total number of system bins. The system is simply diverting an equal share of the total objects to each parallel manual cell. Thus, each parallel sortation cell must have all the same collection bin designations; otherwise, an object may be delivered to a cell that does not have a bin to which the object is mapped. There remains a need, therefore, for a more efficient and more cost effective object processing system that processes objects of a variety of sizes and weights into appropriate collection bins or trays of fixed sizes, yet is efficient in handling objects of varying sizes and weights.

SUMMARY

In accordance with an embodiment, the invention provides a method of processing objects using a programmable motion device is disclosed. The method includes the steps of perceiving identifying indicia representative of an identity of a plurality of objects and directing the plurality of objects toward an input area from at least one input conveyance system, acquiring an object from the plurality of objects at the input area using an end effector of the programmable motion device, and moving the acquired object toward an identified processing location using the programmable motion device, said identified processing location being associated with the identifying indicia and said identified processing location being provided as one of a plurality of processing locations that are radially spaced from the programmable motion device.

In accordance with another embodiment, the invention provides a method of processing objects using a programmable motion device, where the method includes the steps of perceiving identifying indicia representative of an identity of a plurality of objects, acquiring an object from the plurality of objects at an input area using an end effector of the programmable motion device, said input area being in communication with at least one input conveyance system for providing objects to be processed, and moving the acquired object toward an identified processing location using the programmable motion device, said identified processing location being associated with the identifying indicia and the identified processing location being provided as one of a plurality of processing locations that are each located within a radial distance from a center of a base of the programmable motion device.

In accordance with a further embodiment, the invention provides a processing system for processing objects using a programmable motion device. The processing system includes a perception unit for perceiving identifying indicia representative of an identity of a plurality of objects, a routing conveyance system for directing the plurality of objects toward an input area from at least one input conveyance system, and an acquisition system for acquiring an object from the plurality of objects at the input area using an end effector of the programmable motion device, the programmable motion device for moving the acquired object toward an identified processing location. The identified processing location is associated with the identifying indicia and the identified processing location is provided as one of a plurality of processing locations that are each located within a radial distance from a center of a base of the programmable motion device.

BRIEF DESCRIPTION OF THE DRAWINGS

The following description may be further understood with reference to the accompanying drawings in which.

The drawings are shown for illustrative purposes only.

DETAILED DESCRIPTION

In accordance with an embodiment, the invention provides a method of processing objects using a programmable motion device. The method includes the steps of perceiving identifying indicia representative of a plurality of objects and directing the plurality of objects toward an input area from at least one input conveyance system. The method also includes the steps of acquiring an object from the plurality of objects at the input area using an end effector of the programmable motion device, and moving the acquired object toward an identified processing location using the programmable motion control device. The identified processing location is associated with the identifying indicia, and the identified processing location is provided as one of a plurality of processing locations.

Generally, objects need to be identified and conveyed to desired object specific locations. The systems reliably automate the identification and conveyance of such objects, employing in certain embodiments, a set of conveyors, a perception system, and a plurality of destination bins. In short, applicants have discovered that when automating sortation of objects, there are a few main things to consider: 1) the overall system throughput (objects sorted per hour), 2) the number of diverts (i.e., number of discrete locations to which an object can be routed), 3) the total area of the sortation system (square feet), and 4) the capital and annual costs to purchase and run the system.

Processing objects in a break-pack distribution center is one application for automatically identifying and processing objects. As noted above, in a break-pack distribution center, objects commonly arrive in trucks, are conveyed to sortation stations where they are sorted according to desired destinations into boxes (or packages) that are then then loaded in trucks for transport to, for example, shipping or distribution centers or retail stores. In a shipping or distribution center, the desired destination is commonly obtained by reading identifying information printed on the box or package. In this scenario, the destination corresponding to identifying information is commonly obtained by querying the customer's information system. In other scenarios, the destination may be written directly on the box, or may be known through other means such as by assignment to a vendor bin.

The system also requests specific bins of objects from a storage system, which helps optimize the process of having desired objects be delivered to specific singulator cells in an efficient way without simply letting all bins of objects appear at each singulator cell in a purely random order.

Figure 1:
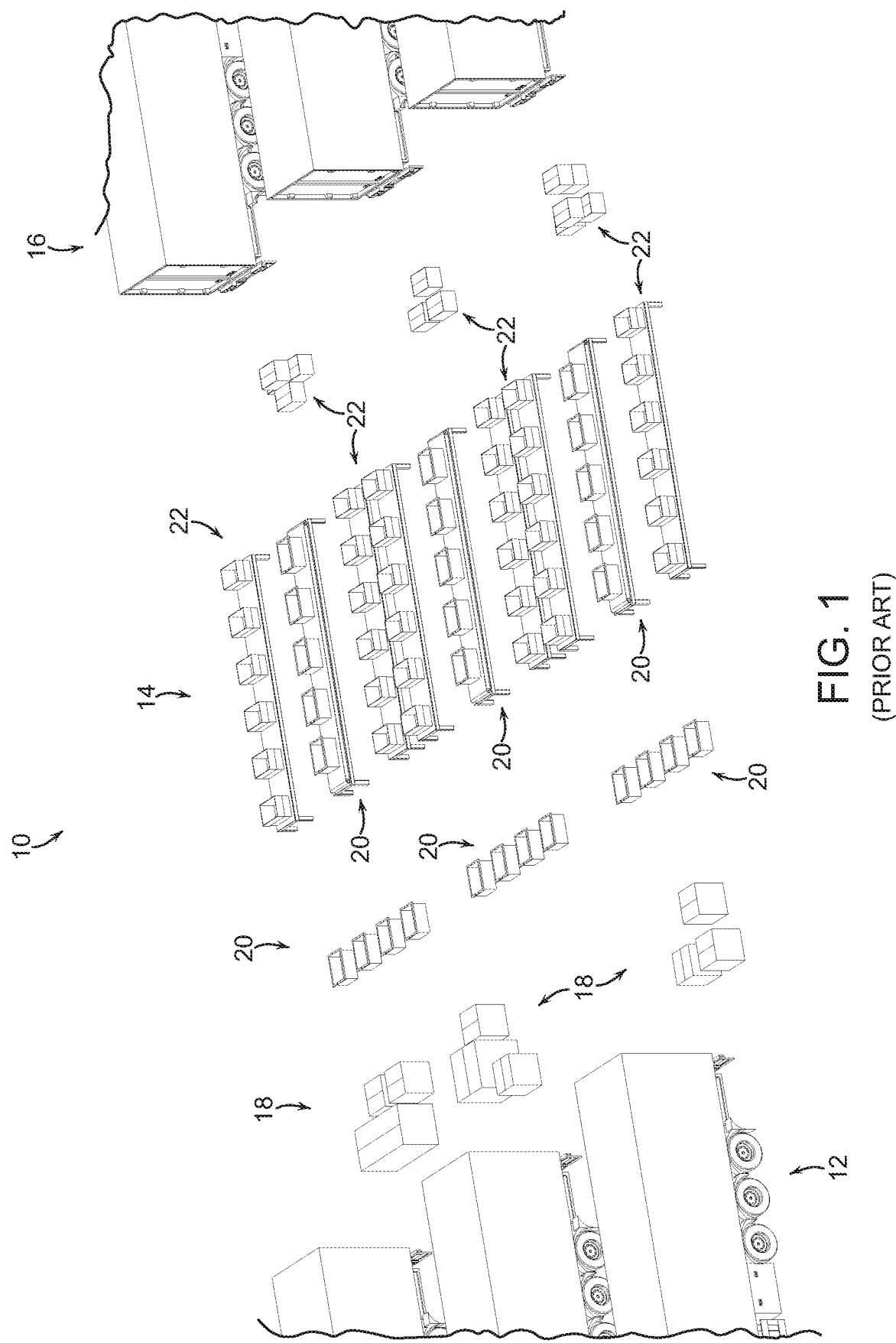
FIG. 1 shows an illustrative diagrammatic view of an object processing system of the prior art.
Figure 2:
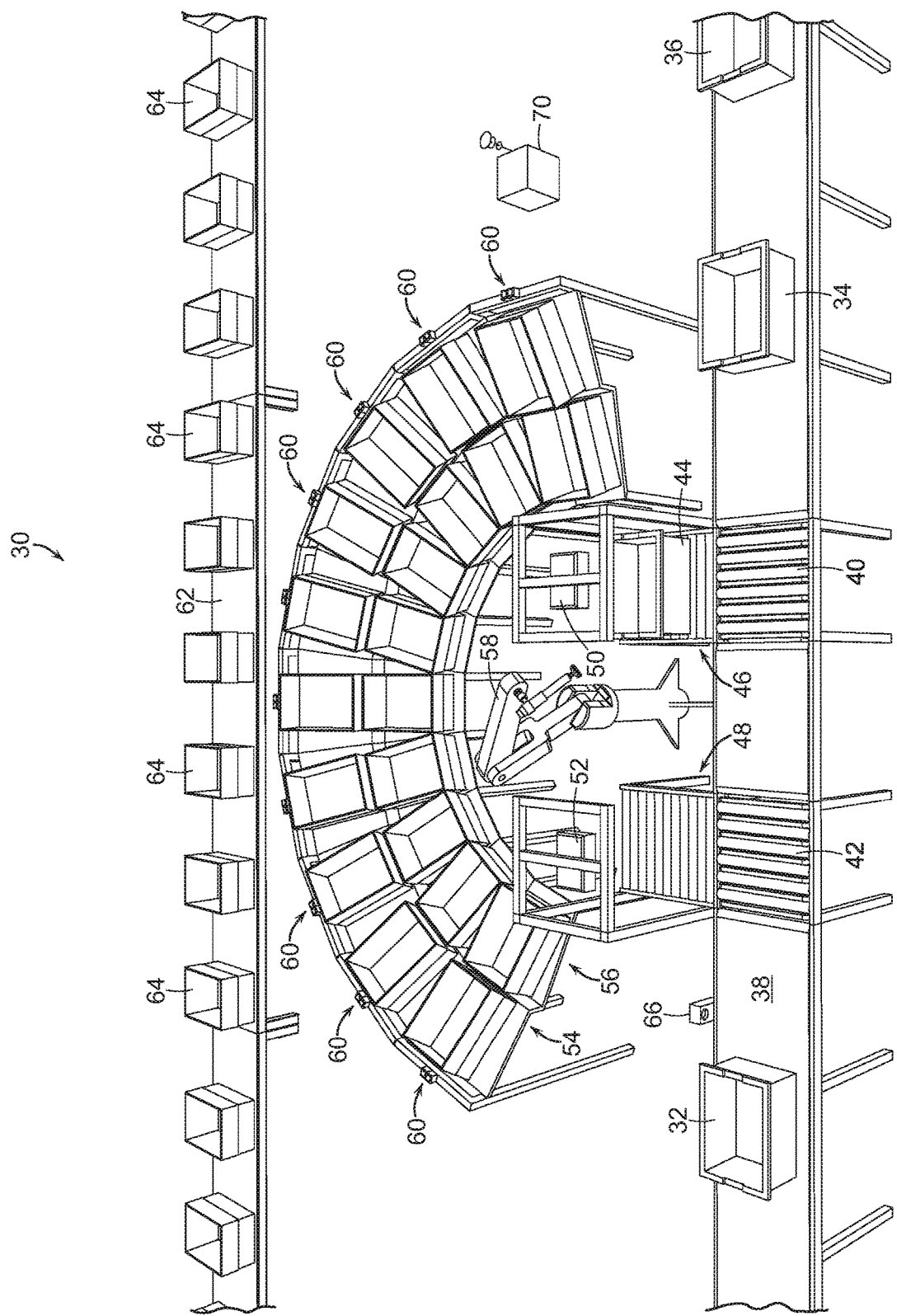
FIG. 2 shows an illustrative diagrammatic view of an object processing system in accordance with an embodiment of the present invention.

FIG. 2, for example, shows a system 30 in accordance with an embodiment of the present invention that receives decanted vendor bins, e.g., 32, 34, 36 on an in-feed conveyor 38. The in-feed conveyor 38 includes one or more bi-direction actuatable rollers, e.g., 40, 42, that may direct a vendor bin (e.g., 44 shown), toward an input area (e.g., 46, 48). Each input area 46, 48 may include an overhead perception unit 50, 52 that may capture perception information regarding the contents of bins (e.g., 44) that are directed toward an input area 46, 48. In further embodiments, a further perception unit 66 may be provided that captures perception information regarding a label that is applied to each bin 22, 24, 26 that associates the bin with the contents of the bin. In this way, the system may only direct bins (e.g., 44) toward an input area 46, 48 if an object from the bin 44 is needed at one of a plurality of processing locations.

The plurality of processing locations 52 are provided for example, as a plurality of sets of boxes 54, 56 that are generally provided in a plurality of semicircles of varying height and radial distances from a central region. At the central region, is provided a base of a programmable motion device (e.g., a robotic articulated arm) 58 that includes an end effector for grasping objects from the input areas 46, 48, and is programmed to move each object to one of the boxes of the plurality of sets of boxes 54, 56. When a box is complete, an indicator 60 such as a light, is illuminated, indicating that the associated box may be removed (e.g., by a human) to an output conveyor 62. The completed box (e.g., 64) may be sealed and labeled at the processing station 30, or may be sealed and labeled at a later station.

It is assumed that the vendor bins that contain objects are marked in one or more places on their exterior of the vendor bin with a visually distinctive mark such as a barcode (e.g., providing a UPC code) or radio-frequency identification (RFID) tag or mailing label so that they may be sufficiently identified with a scanner for processing. The type of marking depends on the type of scanning system used, but may include 1D or 2D code symbologies. Multiple symbologies or labeling approaches may be employed. The types of scanners employed are assumed to be compatible with the marking approach. The marking, e.g. by barcode, RFID tag, mailing label or other means, encodes a identifying indicia (e.g., a symbol string), which is typically a string of letters and/or numbers. The symbol string associates the vendor bin with a specific set of homogenous objects.

The operations of the system described above are coordinated with a central control system 70 as shown in FIG. 2 that communicates wirelessly with the articulated arm 58, the perception units 50, 52, 66, as well as the bi-directional actuatable rollers 40, 42. This system determines from symbol strings the UPC associated with a vendor bin, as well as the outbound destination for the object. The central control system 70 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each inbound object.

Figure 3:
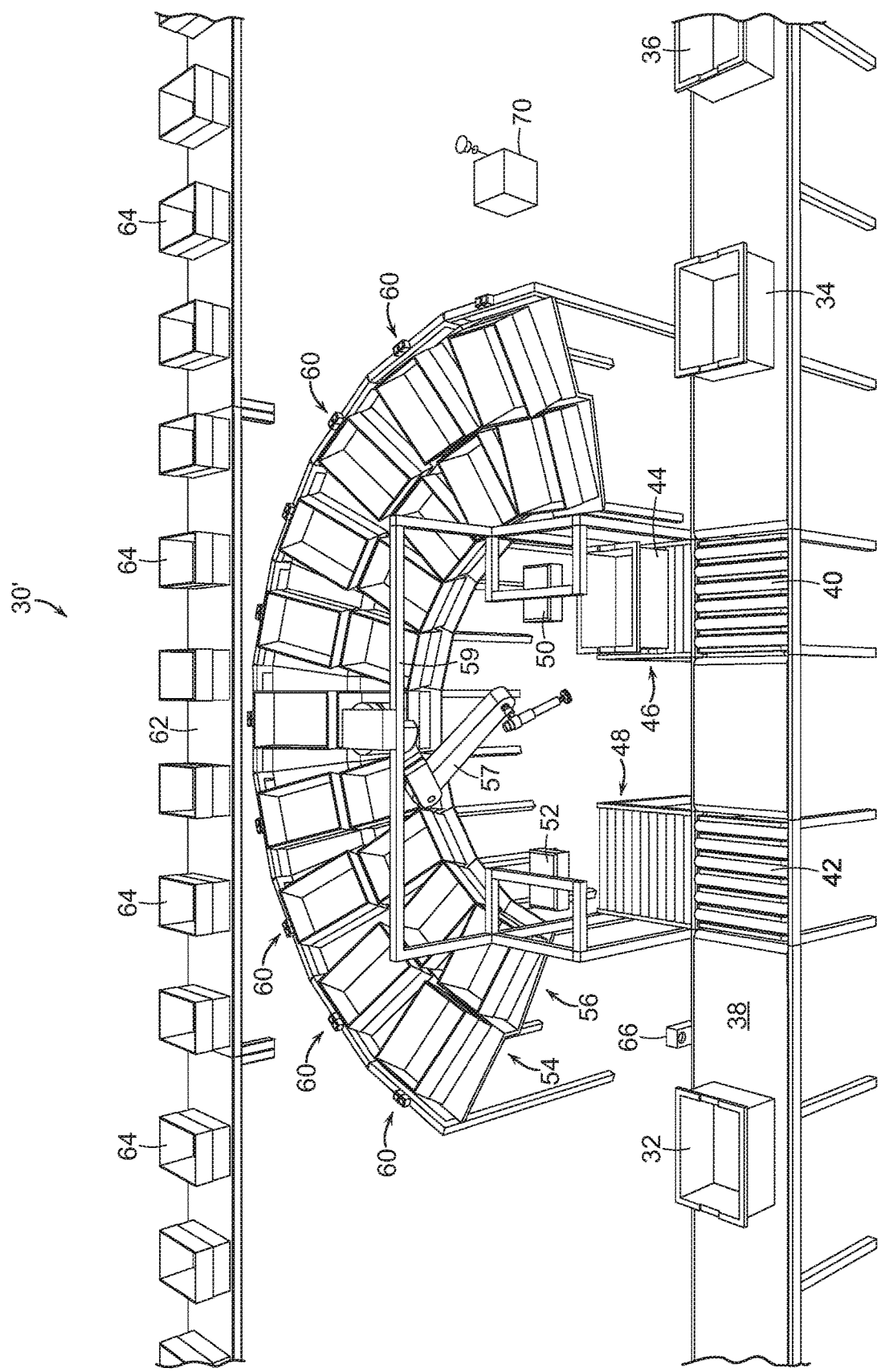
FIG. 3 shows an illustrative diagrammatic view of an object processing system in accordance with another embodiment of the present invention.

In accordance with another embodiment, the system may employ a programmable motion device that is suspended from above, and processes decanted vendor bins from an in-feed conveyor, moving objects to processing locations as discussed above. With reference to FIG. 3, such a system 30' may employ a programmable motion device (e.g., an articulated arm) 57 that is suspended from a rack 59 that also includes the perception units 50, 52. The remaining elements of FIG. 3 are the same as those of FIG. 2. Again, the operations of the system are coordinated with a central control system 70 that communicates wirelessly with the articulated arm 57, the perception units 50, 52, 66, as well as the bi-directional actuatable rollers 40, 42.

Figure 4:
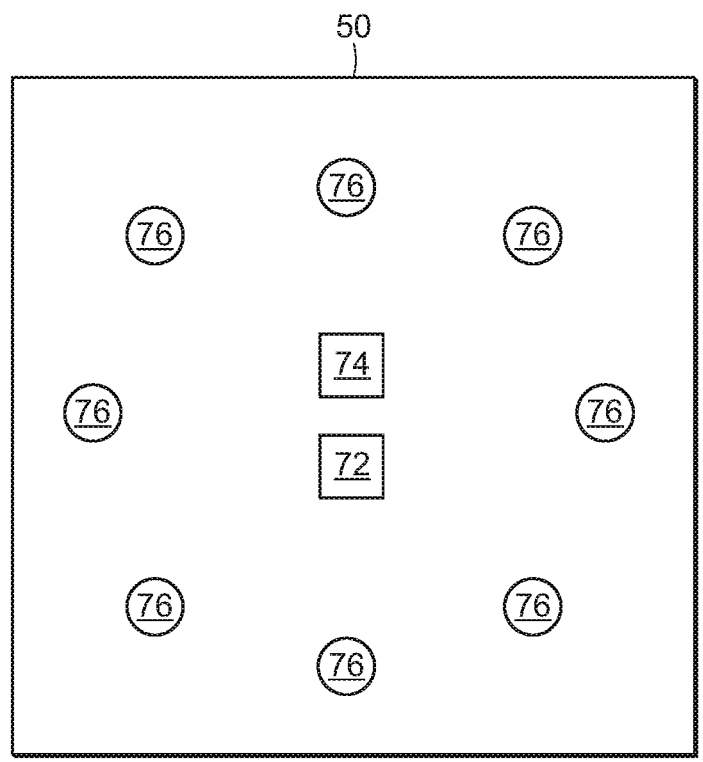
FIG. 4 shows an illustrative diagrammatic view of an underside of a perception system of FIG. 2 or 3.

As discussed above, systems of embodiments include a perception system (e.g., 50, 52) that is mounted above a bin of objects to be processed, looking down into the bin (e.g., 44). The system 50, for example and as shown in FIG. 4, may include (on the underside thereof), a camera 72, a depth sensor 74 and lights 76. A combination of 2D and 3D (depth) data is acquired. The depth sensor 74 may provide depth information that may be used together with the camera image data to determine depth information regarding the various objects in view. The lights 76 may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 5:
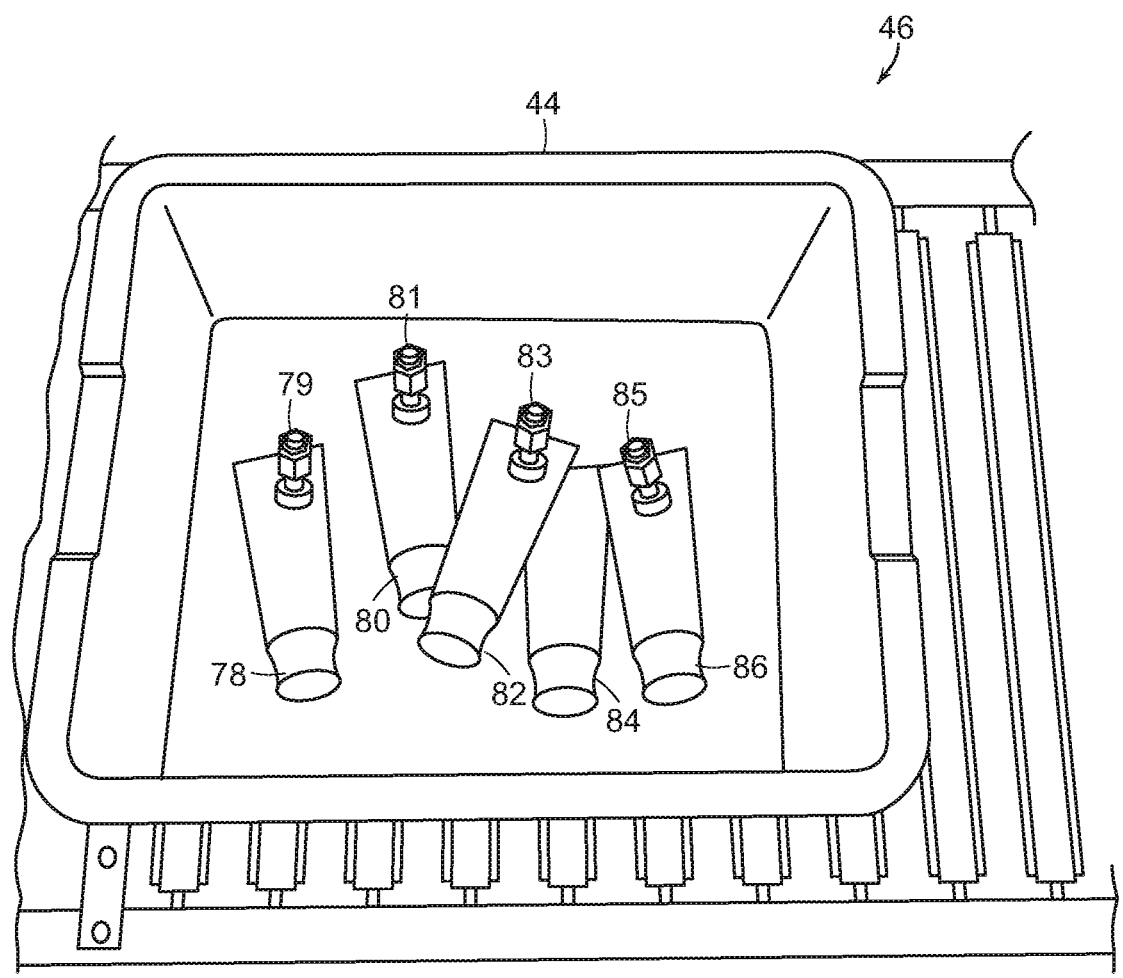
FIG. 5 shows an illustrative diagrammatic view from the perception system of FIG. 3, showing a view of objects within a bin of objects to be processed.

FIG. 5 shows an image view from the perception unit 50. The image view shows a bin 44 in an input area 46 (a conveyor), and the bin 44 contains objects 78, 80, 82, 84 and 86. In the present embodiment, the objects are homogenous, and are intended for distribution to different break-pack packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp location 81 does not because its associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location as shown in FIG. 5. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasp of such two different objects. If the system executes a grasp at either of these bad grasp locations, it will either fail to acquire the object due to a bad grasp point where a vacuum seal will not occur (e.g., on the right), or will acquire the object at a grasp location that is very far from the center of mass of the object (e.g., on the left) and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Figure 6A:
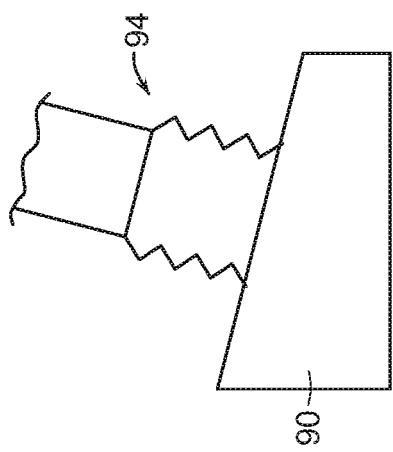
FIGS. 6A and 6B show an illustrative diagrammatic view of a grasp selection process in an object processing system of an embodiment of the present invention.
Figure 6B:
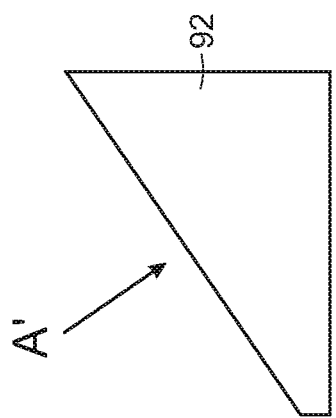

As shown in FIGS. 6A and 6B, the perception system may also identify portions of an object that are the most flat in the generation of good grasp location information. In particular, if an object includes a tubular end and a flat end such as object 87, the system would identify the more flat end as shown at 88 in FIG. 6B. Additionally, the system may select the area of an object where a UPC code appears, as such codes are often printed on a relatively flat portion of the object to facilitate scanning of the barcode.

Figure 7A:
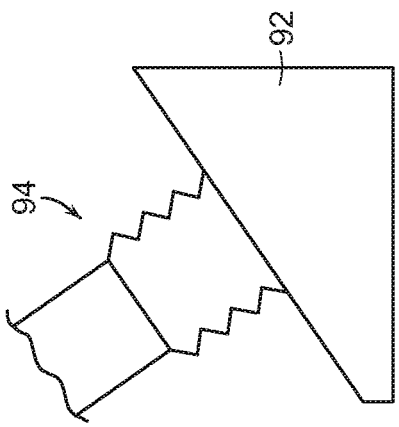
FIGS. 7A and 7B show an illustrative diagrammatic view of a grasp planning process in an object processing system of an embodiment of the present invention.
Figure 8A:
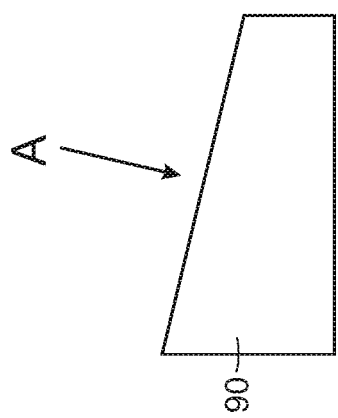
FIGS. 8A and 8B show an illustrative diagrammatic view of a grasp execution process in an object processing system of an embodiment of the present invention.
Figure 7B:
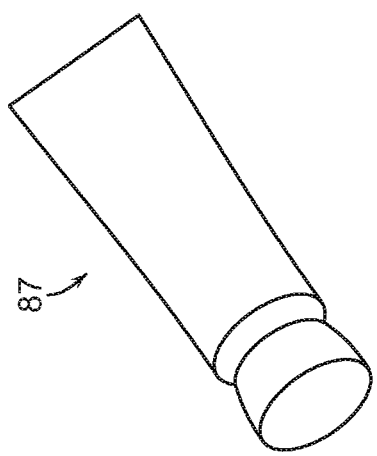
Figure 8B:
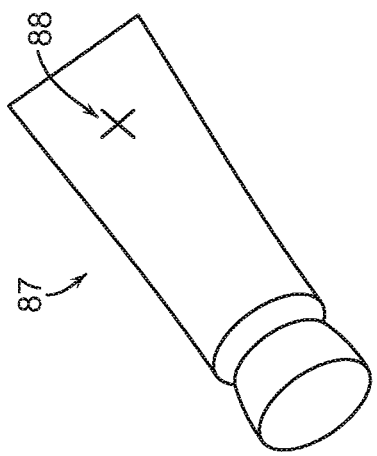

FIGS. 7A and 7B show that for each object 90, 92, the grasp selection system may determine a direction A, A' respectively that is normal to the selected flat portion of the object 90, 92. As shown in FIGS. 8A and 8B, the robotic system will then direct the end effector 94 to approach each object 90, 92 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

The invention provides therefore in certain embodiments that grasp optimization may be based on determination of surface normal, i.e., moving the end effector to be normal to the perceived surface of the object (as opposed to vertical or gantry picks), and that such grasp points may be chosen using fiducial features as grasp points, such as picking on a barcode, given that barcodes are almost always applied to a flat spot on the object.

In accordance with various embodiments therefore, the invention further provides a sortation system that may learn object grasp locations from experience (and optionally human guidance). Systems designed to work in the same environments as human workers will face an enormous variety of objects, poses, etc. This enormous variety almost ensures that the robotic system will encounter some configuration of object(s) that it cannot handle optimally; at such times, it is desirable to enable a human operator to assist the system and have the system learn from non-optimal grasps.

The system optimizes grasp points based on a wide range of features, either extracted offline or online, tailored to the gripper's characteristics. The properties of the suction cup influence its adaptability to the underlying surface, hence an optimal grasp is more likely to be achieved when picking on the estimated surface normal of an object rather than performing vertical gantry picks common to current industrial applications.

In addition to geometric information the system uses appearance based features as depth sensors may not always be accurate enough to provide sufficient information about graspability. For example, the system can learn the location of fiducials such as barcodes on the object, which can be used as an indicator for a surface patch that is flat and impermeable, hence suitable for a suction cup. One such example is the use of barcodes on consumer products. Another example is shipping boxes and bags, which tend to have the shipping label at the object's center of mass and provide an impermeable surface, as opposed to the raw bag material, which might be slightly porous and hence not present a good grasp.

By identifying bad or good grasp points on the image, a correlation is established between features in the 2D/3D imagery and the idea of good or bad grasp points; using this data and these correlations as input to machine learning algorithms, the system can eventually learn, for each image presented to it, where to grasp and where to avoid.

This information is added to experience based data the system collects with every pick attempt, successful or not. Over time the robot learns to avoid features that result in unsuccessful grasps, either specific to an object type or to a surface/material type. For example, the robot may prefer to avoid picks on shrink wrap, no matter which object it is applied to, but may only prefer to place the grasp near fiducials on certain object types such as shipping bags.

This learning can be accelerated by off-line generation of human-corrected images. For instance, a human could be presented with thousands of images from previous system operation and manually annotate good and bad grasp points on each one. This would generate a large amount of data that could also be input into the machine learning algorithms to enhance the speed and efficacy of the system learning.

In addition to experience based or human expert based training data, a large set of labeled training data can be generated based on a detailed object model in physics simulation making use of known gripper and object characteristics. This allows fast and dense generation of graspability data over a large set of objects, as this process is not limited by the speed of the physical robotic system or human input.

The robotic system may also employ motion planning using a trajectory database that is dynamically updated over time, and is indexed by customer metrics. The problem domains contain a mix of changing and unchanging components in the environment. For example, the objects that are presented to the system are often presented in random configurations, but the target locations into which the objects are to be placed are often fixed and do not change over the entire operation.

One use of the trajectory database is to exploit the unchanging parts of the environment by pre-computing and saving into a database trajectories that efficiently and robustly move the system through these spaces. Another use of the trajectory database is to constantly improve the performance of the system over the lifetime of its operation. The database communicates with a planning server that is continuously planning trajectories from the various starts to the various goals, to have a large and varied set of trajectories for achieving any particular task. In various embodiments, a trajectory path may include any number of changing and unchanging portions that, when combined, provide an optimal trajectory path in an efficient amount of time.

Figure 9:
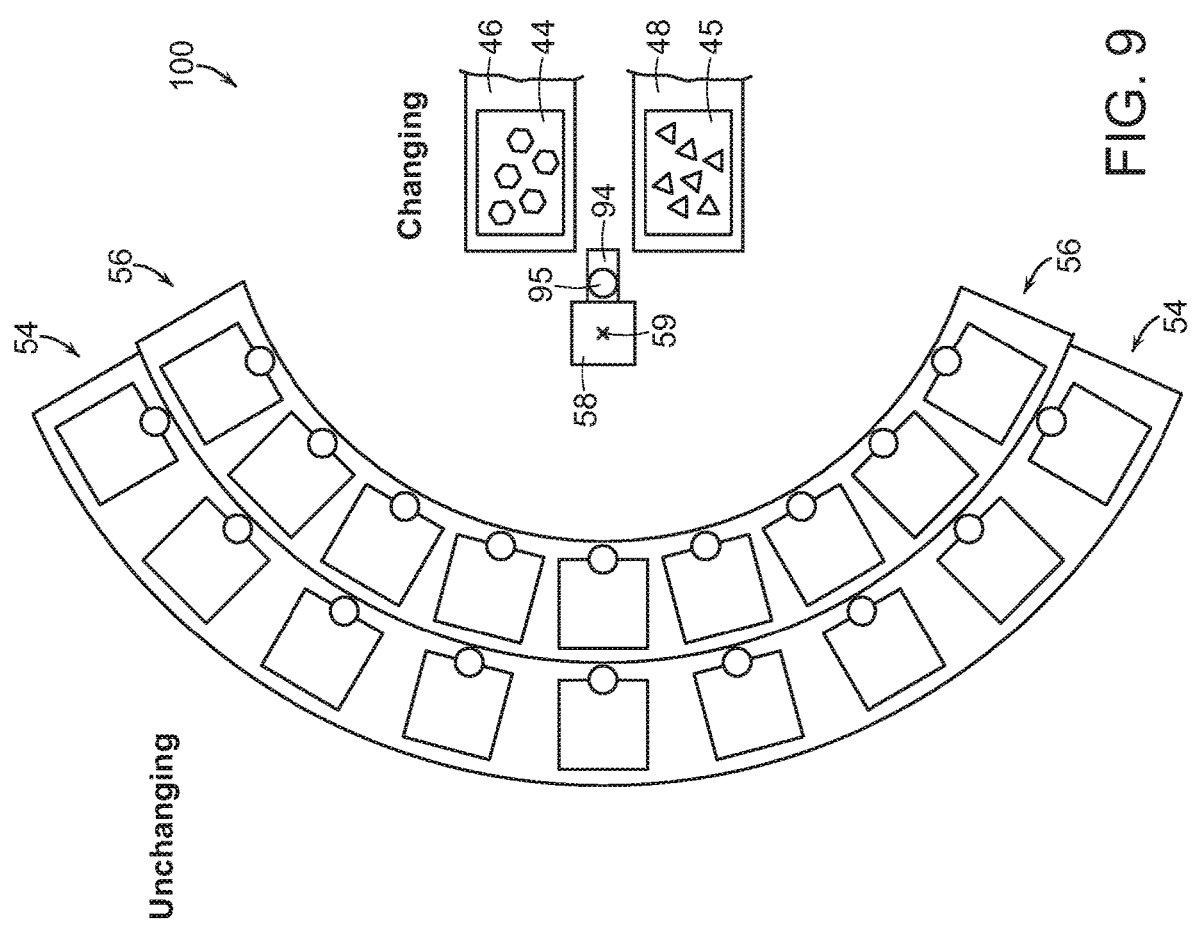
FIG. 9 shows an illustrative diagrammatic top view of an object processing system in accordance with another embodiment of the invention that identifies changing and unchanging motion planning general areas.

FIG. 9 for example, shows a diagrammatic view of a robotic sortation system 100 that includes input area conveyors 46, 48 that provide input bins 44, 45 to a programmable motion device 58, such as an articulated arm, having a base as shown at 59. The robotic system (shown diagrammatically at 58) includes an end effector (shown diagrammatically at 94) that is programmed to have a home position (shown at 95), and is programmed for moving objects from an input bin (e.g., 44, 45) to processing locations, e.g., destination locations at the plurality of sets of boxes 54, 56. Again, the robotic system 58 may include a defined home or base location 95 to which each object may initially be brought upon acquisition from the bin (e.g., 44, 45). In certain embodiments, the system may include a plurality of base locations, as well as a plurality of predetermined path portions associated with the plurality of base locations. The trajectories taken by the articulated arm of the robot system from the input bin to the base location are constantly changing based in part, on the location of each object in the input bin, the orientation of the object in the input bin, and the shape, weight and other physical properties of the object to be acquired.

Once the articulated arm has acquired an object and is positioned at the base location, the paths to each of the plurality of sets of destination bins 54, 56 are not changing. In particular, each destination bin is associated with a unique destination bin location, and the trajectories from the base location to each of the destination bin locations individually is not changing. A trajectory, for example, may be a specification for the motion of a programmable motion device over time. In accordance with various embodiments, such trajectories may be generated by experience, by a person training the system, and/or by automated algorithms. For a trajectory that is not changing, the shortest distance is a direct path to the target destination bin, but the articulated arm is comprised of articulated sections, joints, motors etc. that provide specific ranges of motion, speeds, accelerations and decelerations. Because of this, the robotic system may take any of a variety of trajectories between, for example, base locations and destination bin locations.

Figure 10:
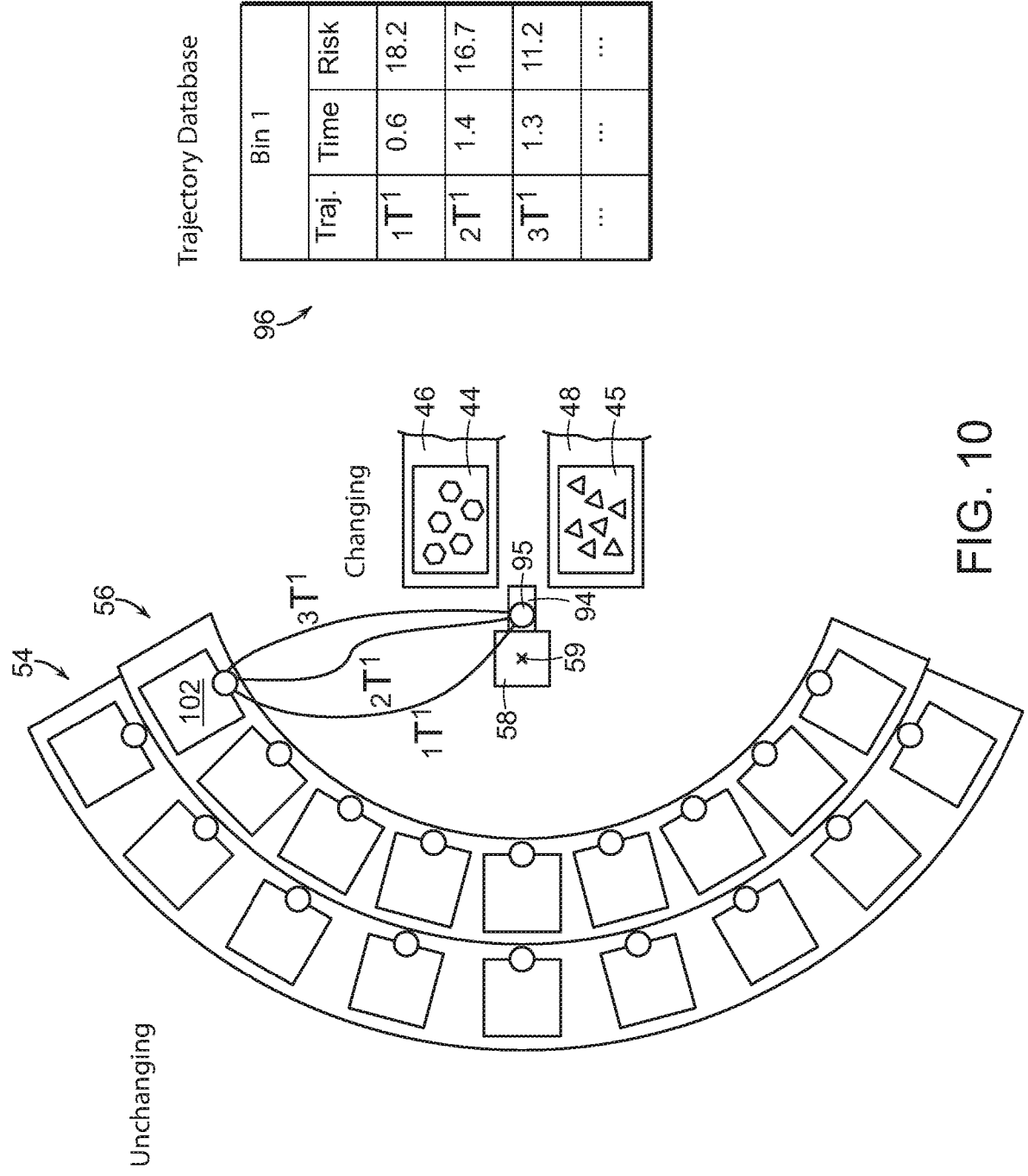
FIG. 10 shows an illustrative diagrammatic top view of the system of FIG. 9, showing multiple possible paths from the programmable motion device to a destination bin.

FIG. 10 for example, shows three such trajectories ($_1T^1$, $_2T^1$ and $_3T^1$) between base location 95 and a destination bin location 102. The elements of FIG. 9 are the same as those of FIG. 8. Each trajectory will have an associated time as well as an associated risk factor. The time is the time it takes for the articulated arm of the robotic system to accelerate from the base location 95 toward the destination bin 102, and decelerate to the destination bin location 106 in order to place the object in the destination bin 102.

The risk factor may be determined in a number of ways including whether the trajectory includes a high (as predefined) acceleration or deceleration (linear or angular) at any point during the trajectory. The risk factor may also include any likelihood that the articulated arm may encounter (crash into) anything in the robotic environment. Further, the risk factor may also be defined based on learned knowledge information from experience of the same type of robotic arms in other robotic systems moving the same object from a base location to the same destination location.

As shown in the table at 96 in FIG. 10, the trajectory $_1T^1$ from the base location 95 to the destination location 102 may have a fast time (0.6 s) but a high risk factor. The trajectory $_2T^1$ from the base location 95 to the destination location 102 may have a much slower time (1.4 s) but still a fairly high risk factor (16.7). The trajectory $_3T^1$ from the base location 95 to the destination location 102 may have a relatively fast time (1.3 s) and a moderate risk factor (11.2). The choice of selecting the fastest trajectory is not always the best as sometimes the fastest trajectory may have an unacceptably high risk factor. If the risk factor is too high, valuable time may be lost by failure of the robotic system to maintain acquisition of the object. Different trajectories therefore, may have different times and risk factors, and this data may be used by the system in motion planning.

Figure 11:
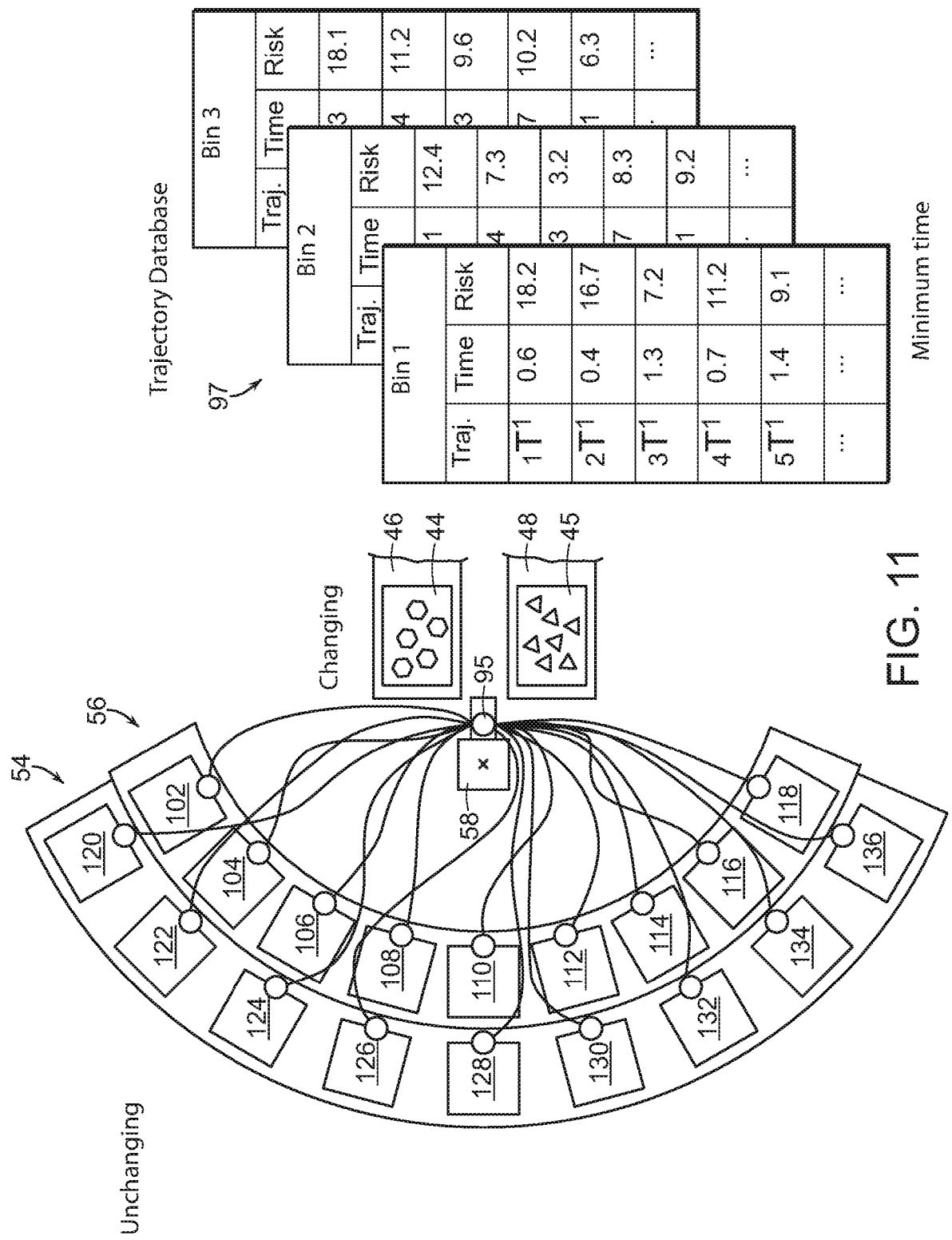
FIG. 11 shows an illustrative diagrammatic top view of the system of FIG. 9, showing multiple possible paths from the programmable motion device to multiple destination bins with an emphasis on minimum time.

FIG. 11, for example, shows minimum time-selected trajectories from the base location 95 to each of destination bin locations 102-136. In particular, the tables shown at 97 that the time and risk factors for a plurality of the destination bins, and the trajectories from the base location 95 to each of a plurality of the destination bin locations are chosen to provide the minimum time for motion planning for motion planning under a risk factor of 14.0.

Figure 12:
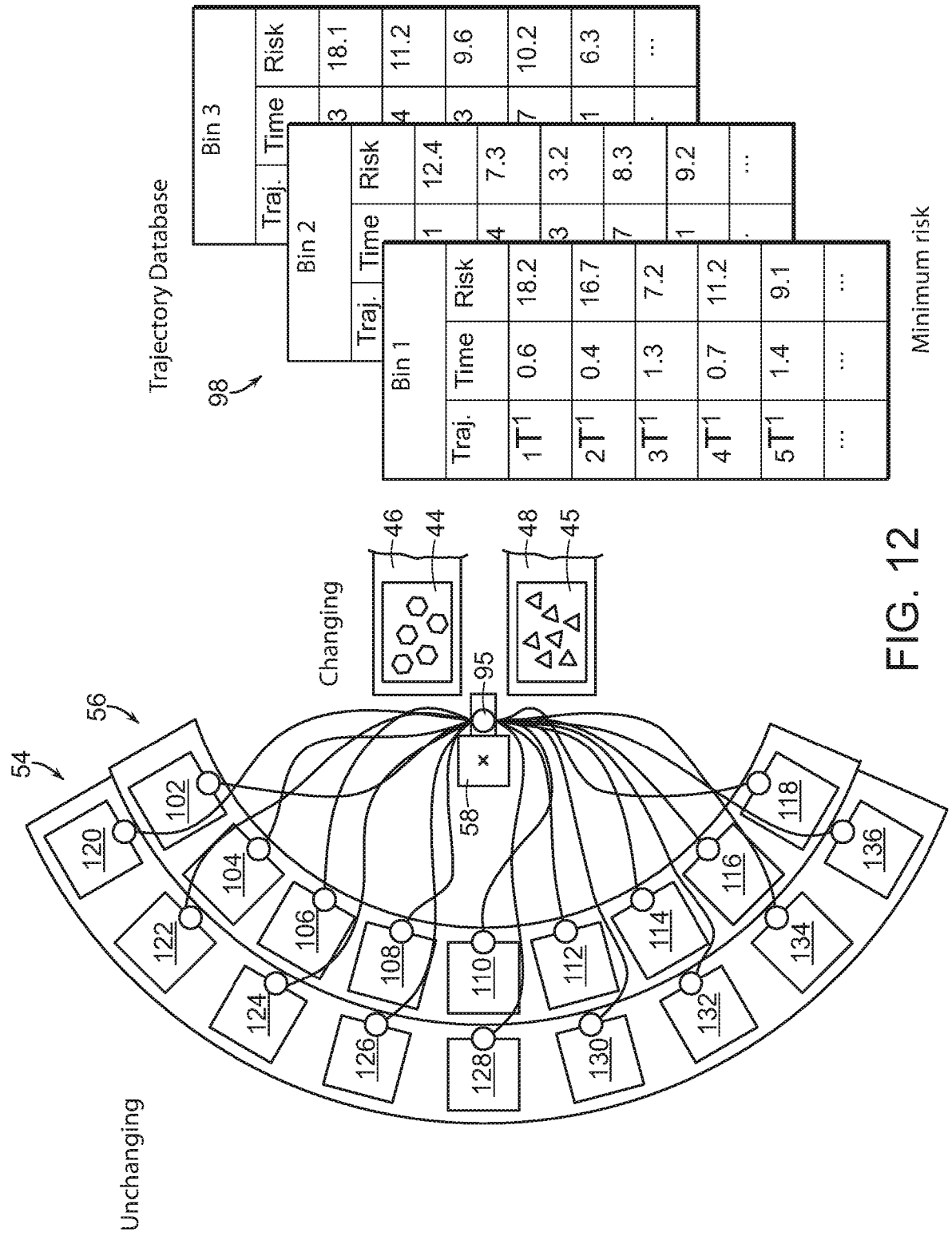
FIG. 12 shows an illustrative diagrammatic top view of the system of FIG. 9, showing multiple possible paths from the programmable motion device to multiple destination bins with an emphasis on minimum risk.

FIG. 12 shows minimum risk-factor-selected set of trajectories from the base location 95 to each of the destination bin locations 102-136. Again, the tables shown at 97 show the time and risk factors for the plurality of the destination bins (e.g., 1-3). The trajectories from the base location 95 to each of the destination bin locations 102-136 are chosen to provide the minimum risk factor for motion planning for motion planning under a maximum time of 1.2 seconds.

The choice of fast time vs. low risk factor may be determined in a variety of ways, for example, by choosing the fastest time having a risk factor below an upper risk factor limit (e.g., 12 or 14), or by choosing a lowest risk factor having a maximum time below an upper limit (e.g., 1.0 or 1.2). Again, if the risk factor is too high, valuable time may be lost by failure of the robotic system to maintain acquisition of the object. An advantage of the varied set is robustness to small changes in the environment and to different-sized objects the system might be handling: instead of re-planning in these situations, the system iterates through the database until it finds a trajectory that is collision-free, safe and robust for the new situation. The system may therefore generalize across a variety of environments without having to re-plan the motions.

Overall trajectories therefore, may include any number of changing and unchanging sections. For example. networks of unchanging trajectory portions may be employed as commonly used paths (roads), while changing portions may be directed to moving objects to a close-by unchanging portion (close road) to facilitate moving the object without requiring the entire route to be planned. For example, the programmable motion device (e.g., a robot) may be tasked with orienting the grasped object in front of an automatic labeler before moving towards the destination. The trajectory to sort the object therefore, would be made up of the following trajectory portions. First, a grasp pose to a home position (motion planned). Then, from home position to an auto-labeler home (pulled from a trajectory database). Then, from the auto-labeler home to a labelling pose (motion planned). Then, from the labelling pose to an auto-labeler home (either motion planned or just reverse the previous motion plan step). Then, from the auto-labeler home to the intended destination (pulled from the trajectory database). A wide variety of changing and unchanging (planned and pulled from a database) portions may be employed in overall trajectories. In accordance with further embodiments, the object may be grasped from a specific pose (planned), and when the object reaches a destination bin (from the trajectory database), the last step may be to again place the object in the desired pose (planned) within the destination bin.

In accordance with further embodiments, the motion planning may also provide that relatively heavy items (as may be determined by knowing information about the grasped object or by sensing weight—or both—at the end effector) may be processed (e.g., moved in trajectories) and placed in boxes in very different ways than the processing and placement of relatively light objects. Again, the risk verses speed calculations may be employed for optimization of moving known objects of a variety of weights and sizes as may occur, for example, in the processing of a wide variety of consumer products.

Figure 13:
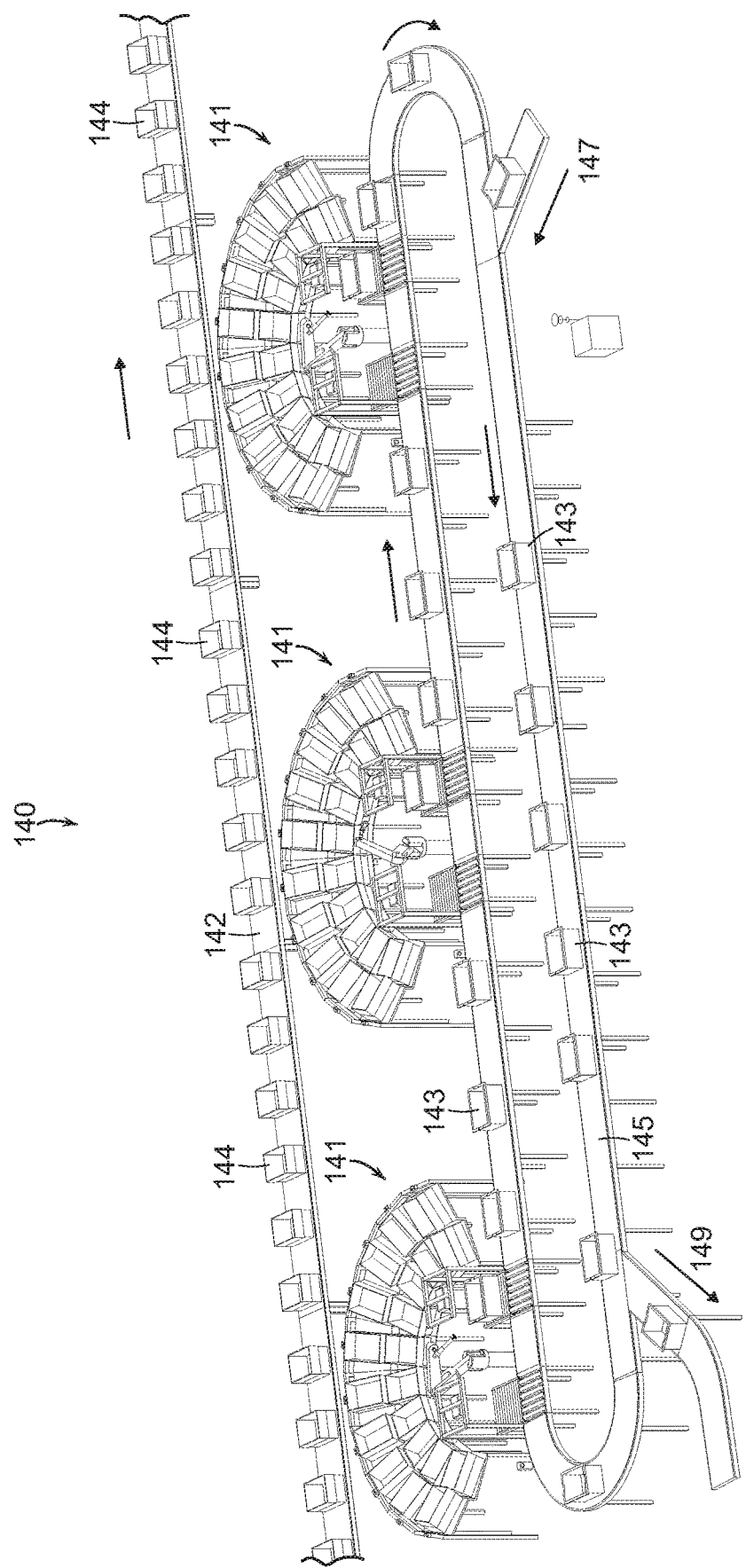
FIG. 13 shows an illustrative diagrammatic view of an object processing system in accordance with a further embodiment of the present invention involving a plurality of processing stations.

In accordance with a further embodiment of the present invention, and with reference to FIG. 13, a multi-station system 140 includes multiple processing stations 141 that are similar to those shown in at 30 and 30' in FIGS. 2 and 3, respectively. The processing stations receive decanted vendor bins 143 via a circulating input conveyor 145 that includes an in-bound feed 147 as well as an out-bound exit 149 for SKU totes that need to be returned to storage. Only SKU totes that are needed by a given singulator will be directed to that singulator. Once that singulator has taken all needed objects from that tote, the tote will be routed to either another singulator that needs it, or back into storage. The system also includes an output conveyor 142 on which processed break-pack packages 144 may be placed when completed. Each processing station 141 includes a programmable motion device that moves objects from an in-feed area to any of a plurality of processing locations as discussed above with reference to FIGS. 2 and 3. The system 140 may further include multiple processing stations as well as multiple input conveyors and multiple output conveyors.

The system, therefore, provides means that interface with the customer's outgoing object conveyance systems. When a bin (or package) is full as determined by the system (in monitoring system operation), a human operator may pull the bin from the processing area, and place the bin in an appropriate conveyor. When a bin is full, it gets removed to the closed/labelled, another empty bin is immediately placed in the location freed up by the removed full bin, and the system continues processing as discussed above.

In accordance with a specific embodiment, the invention provides a user interface that conveys all relevant information to operators, management, and maintenance personnel. In a specific embodiment, this may include lights indicating bins that are about to be ejected (as full), bins that are not completely properly positioned, the in-feed hopper content level, and the overall operating mode of the entire system. Additional information might include the rate of object processing and additional statistics. In a specific embodiment, the system may automatically print labels and scan labels before the operator places the packages on an output conveyor. In accordance with a further embodiment, the system may incorporate software systems that interface with the customer's databases and other information systems, to provide operational information to the customer's system, and to query the customer's system for object information.

Those skilled in the art will appreciate that numerous modifications and variations may be made to the above disclosed embodiments without departing from the spirit and scope of the present invention.

What is claimed is:

1. A processing system for processing objects using a programmable motion device, said processing system comprising:
    a perception unit for perceiving identifying indicia representative of an identity of each of a plurality of objects;
    a routing conveyance system for directing the plurality of objects toward an input area from at least one input conveyance system, the input area including an input station accessible by the programmable motion device;
    a plurality of processing bins provided in a plurality of semicircular rows that curve toward the input station, the plurality of semicircular rows of processing bins increasing in radial elevation as a respective distance of each row increases from a stationary base of the programmable motion device; and
    an acquisition system for acquiring an object from the plurality of objects at the input station using an end effector of the programmable motion device, the programmable motion device being located between the input station and the plurality of semicircular rows of processing bins and controllable to move the acquired object from the input station toward an identified processing bin, said identified processing bin being associated with the identifying indicia and said identified processing bin being provided as one of the plurality of processing bins.

2. The processing system as claimed in claim 1, wherein the input area includes two input stations, one on either side of the programmable motion device.

3. The processing system as claimed in claim 1, wherein the stationary base of the programmable motion device is positioned on a floor below the input area.

4. The processing system as claimed in claim 1, wherein the stationary base of the programmable motion device is suspended from above with respect to the input area.

5. The processing system as claimed in claim 1, wherein said processing system is provided with a plurality of processing systems, each of which is in communication with the at least one input conveyance system.

6. The processing system as claimed in claim 1, wherein the plurality of semicircular rows of processing bins are each at different elevations.

7. The processing system as claimed in claim 1, wherein the plurality of processing bins are tilted towards the programmable motion device.

8. The processing system as claimed in claim 1, wherein the processing system includes a trajectory planning system for selecting a path to the identified processing bin with an associated minimum risk factor.

9. The processing system as claimed in claim 1, wherein the processing system includes a trajectory planning system for selecting a path to the identified processing bin with an associated minimum time factor.

10. The processing system as claimed in claim 1, wherein each processing bin includes at least one associated indicator light.

11. The processing system as claimed in claim 1, wherein the plurality of semicircular rows of processing bins are arranged between the input conveyance system and an output conveyance system.

12. A processing system for processing objects using a programmable motion device, said processing system comprising:
    a perception unit for perceiving identifying indicia representative of at least one object;

a routing conveyance system for directing the at least one object toward an input area including an input station accessible by the programmable motion device;

a plurality of processing bins provided in a plurality of semicircular rows that curve toward the input station, the plurality of semicircular rows of processing bins increasing in radial distance from a stationary base of the programmable motion device; and an acquisition system for acquiring an object from the plurality of objects at the input station using an end effector of the programmable motion device, the programmable motion device being located between the input station and the plurality of semicircular rows of processing bins and controllable to move the acquired object from the input station toward an identified processing bin, said identified processing bin being associated with the identifying indicia and said identified processing bin being provided as one of the plurality of processing bins.

13. The processing system as claimed in claim 12, wherein the input area includes two input stations, one on either side of the programmable motion device.

14. The processing system as claimed in claim 12, wherein the stationary base of the programmable motion device is positioned on a floor below the input area.

15. The processing system as claimed in claim 12, wherein the stationary base of the programmable motion device is suspended from above with respect to the input area.

16. The processing system as claimed in claim 12, wherein said processing system is provided with a plurality of processing systems, each of which is in communication with an input conveyance system.

17. The processing system as claimed in claim 12, wherein the plurality of semicircular rows of processing bins are each at different elevations.

18. The processing system as claimed in claim 12, wherein the plurality of processing bins are tilted towards the programmable motion device.

19. The processing system as claimed in claim 12, wherein each processing bin includes at least one associated indicator light.

20. The processing system as claimed in claim 12, wherein the processing system includes a trajectory planning system for selecting a path to the identified processing bin with an associated minimum risk factor.

21. The processing system as claimed in claim 12, wherein the processing system includes a trajectory planning system for selecting a path to the identified processing bin with an associated minimum time factor.

22. The processing system as claimed in claim 12, wherein the plurality of semicircular rows of processing bins are arranged between the input station and an output conveyor.

23. A processing system for processing objects using a programmable motion device, said processing system comprising:

a perception unit for perceiving identifying indicia representative of at least one object;

a routing conveyance system for directing the at least one object toward an input area including an input station accessible by the programmable motion device;

a plurality of processing bins provided in a plurality of semicircular rows that curve toward the input station, the plurality of semicircular rows of processing bins increasing in radial elevation as a respective distance of each row increases from a stationary base of the programmable motion device; and an acquisition system for acquiring an object from the plurality of objects at the input station using an end effector of the programmable motion device, the programmable motion device being located between the input station and the plurality of semicircular rows of processing bins and controllable to move the acquired object from the input station toward an identified processing bin, said identified processing bin being associated with the identifying indicia and said identified processing bin being provided as one of the plurality of processing bins.

24. The processing system as claimed in claim 23, wherein the input area includes two input stations, one on either side of the programmable motion device.

25. The processing system as claimed in claim 23, wherein the stationary base of the programmable motion device is positioned on a floor below the input area.

26. The processing system as claimed in claim 23, wherein the stationary base of the programmable motion device is suspended from above with respect to the input area.

27. The processing system as claimed in claim 23, wherein said processing system is provided with a plurality of processing systems, each of which is in communication with an input conveyance system.

28. The processing system as claimed in claim 23, wherein the plurality of semicircular rows of processing bins are each at different elevations.

29. The processing system as claimed in claim 23, wherein the plurality of processing bins are tilted towards the programmable motion device.

30. The processing system as claimed in claim 23, wherein each processing bin includes at least one associated indicator light.

31. The processing system as claimed in claim 23, wherein the processing system includes a trajectory planning system for selecting a path to the identified processing bin with an associated minimum risk factor.

32. The processing system as claimed in claim 23, wherein the processing system includes a trajectory planning system for selecting a path to the identified processing bin with an associated minimum time factor.

33. The processing system as claimed in claim 23, wherein the plurality of semicircular rows of processing bins are arranged between the input station and an output conveyor.

* * * * *